United States Patent
Hohensee et al.

[11] Patent Number: 5,946,460
[45] Date of Patent: Aug. 31, 1999

[54] SYSTEM SETUP VERIFICATION FOR PERIPHERAL DEVICES

[75] Inventors: Reinhard Heinrich Hohensee; James Anthony Krack, both of Boulder, Colo.

[73] Assignee: International Business Machines Corporation, Armonk, N.Y.

[21] Appl. No.: 08/713,913

[22] Filed: Sep. 13, 1996

[51] Int. Cl.⁶ ............................................... G06K 1/00
[52] U.S. Cl. ..................... 395/117; 395/101; 395/105; 395/113
[58] Field of Search ............................. 395/112, 114, 395/115, 116, 117, 828, 829, 101, 105, 106, 111, 113

[56] References Cited

U.S. PATENT DOCUMENTS

| | | |
|---|---|---|
| 4,746,935 | 5/1988 | Allen . |
| 4,797,693 | 1/1989 | Quate . |
| 4,833,491 | 5/1989 | Rezanka ................................. 346/140 |
| 5,040,003 | 8/1991 | Willis . |
| 5,075,874 | 12/1991 | Steeves et al. .......................... 395/112 |
| 5,129,639 | 7/1992 | DeHority ................................. 270/1.1 |
| 5,132,708 | 7/1992 | Schmidlin et al. . |
| 5,363,318 | 11/1994 | McCauley . |
| 5,504,568 | 4/1996 | Saraswat et al. . |
| 5,638,497 | 6/1997 | Kimber et al. .......................... 395/114 |

OTHER PUBLICATIONS

IBM Corporation, *Mixed Object Document Content Architecture Reference*, Aug. 1994, pp. 1–403.

*Primary Examiner*—Edward L. Coles
*Assistant Examiner*—Mark Wallerson
*Attorney, Agent, or Firm*—Charles E. Rohrer

[57] ABSTRACT

A system and method of assuring the proper configuration of a peripheral device to a data processing system so that a job is not commenced unless the proper configuration is established. A unique verification number(s) corresponding to the proper configuration for the job is in the memory of the peripheral device and is available to the data processing system when it corresponds to a current configuration. The verification number(s) for the job is also available to the system from its entry into system resources. Comparison of the verification number(s) for the job from system resources to the verification number(s) indicating current configuration provide assurance of proper peripheral device setup. The invention is exampled for spot color printers used with print servers but applies to any kind of peripheral device. In a second embodiment, verification number(s) for the job from system resources is sent to the peripheral device for establishing its configuration in accordance with the number (s). Necessary alterations of print server software to implement the invention are exampled with reference to the Print Services Facility (PSF) of IBM.

35 Claims, 6 Drawing Sheets

SET-UP DESIGN WORKSHEET

30 — SET-UP TEXT NAME: _______________

31 — SET-UP VERIFICATION ID: _______________
(TWO-BYTE HEXADECIMAL ID)

32 — COLOR SIDE: COLOR ON FRONT ☐  COLOR ON BACK ☐

33 — VIRTUAL PRINTHEADS

| INK COLOR | AFP HIGHLIGHT COLOR # (1, 2, OR 3) | LOCATION (IN PELS) | WIDTH (IN PELS) |
|---|---|---|---|
| | 34 | 35 | 36 |
| | | | |
| | | | |
| | | | |
| | | | |
| | | | |
| | | | |
| | | | |
| | | | |

37 — PRE-REQUISITE SET-UP:
(SET-UP VERIFICATION ID'S)

SYSTEM SETUP VERIFICATION FOR PERIPHERAL DEVICES

This invention relates to data processing equipment and, more particularly, to the prevention of errors if peripheral devices are not set up to operate according to system instructions.

BACKGROUND OF THE INVENTION

The invention will be described, herein, with respect to a spot color printer utilized with a black and white printer to prepare printed output in accordance with the requirement of the data stream to be printed. The invention however is applicable to any type of peripheral device as will become apparent.

Spot color printers may be utilized with black and white printers to place highlight colors at various locations on the printed document. Such arrangements can be used in any application but might be particularly useful with high speed printers which produce production jobs such as, for example, the monthly billings of a utility company. The print server to run the job is located in a computer, which may be a large mainframe, sending a data stream to a control unit connected to one or more high speed black and white printers. With a spot color printer located to receive the output of the high speed printer, highlight colors may be added to the document. One such spot color printer for use in the environment described above is an ink-jet based printer with eight printheads. Each printhead is capable of printing in a 10.16 mm (0.4 inch) width, consequently, the device is a spot printer that adds color to the printed sheet but is not capable of printing color over the entire sheet. The eight printheads must be positioned so that they can provide the desired color over a swath of a desired size, thus enabling the user to highlight, for example, their corporation logo and highlight certain other information such as, for example, the amount due and the due date. Perhaps a third color swath on the sheet may highlight some marketing information. In the particular device which will be used to illustrate the instant invention the eight printheads have the capability of providing up to three colors on one sheet. Each printhead has 96 jets to cover its 0.4 inch swath width. The number of jets utilized will depend on the setup of the machine. Less than 96 jets can be utilized, and if the desired color swath is to be greater than 0.4 inch, more than one printhead with that color may be required. Multiple colors can be included in the same swath by locating printheads with different color inks within that swath.

In setting up the spot color printer, for example, printheads with blue ink may be positioned to print a swath of blue near the top of a sheet of paper to highlight the company logo. Red printheads may print along the middle of the page where the amount due and date due are located. And perhaps a green swath is located at the bottom of the page in order to highlight some marketing material. Perhaps the blue swath at the top is 1 inch in width, the red swath in the middle is ½ inch in width, and the green swath is 3.2 inches minus the 1½ inch already used. Color may not appear on any other position on the sheet and red will not appear in any place except in the designated ½ inch.

The problem addressed by this invention is the problem of assuring that the spot color printer is correctly set up in order to run the production job properly. Jobs which are being run at high speed for several days at a time produce volumes of printed output, and it is essential that the setup be correct. Such jobs may run night and day and over weekends when only relatively unskilled operators are present. If a production run begins, for example, or a Friday afternoon and on Monday morning the printed output contains incorrect coloration for the company logo, the magnitude of the problem is apparent. The key to solving the problem is to make sure that if the job is not set up correctly, it will not run at all, and production installations printing such large jobs need absolute assurance that such protection is present.

One possible solution for the problem is to control the setup of the peripheral device by placing instructions within the data stream so that the spot color printer receives direction for its setup from the print server. Such an approach, however, has serious drawbacks in that the print server software must be reorganized to provide for the various configuration possibilities that the spot color printer can take; and the data stream is burdened with configuration data. Moreover, if the operational characteristics of the spot color printer are changed in the future, the system print server software would require revision in accordance with the new capabilities engineered into the spot color printer. Such a solution is device dependent and could not be used for any peripheral device except for the particular spot color printer for which it is designed. Every different new model of a peripheral device would require modification of the print server software as would every different kind of peripheral device.

The solution which the inventors provide herein is not tied to spot color technology or the number of print heads or any specific type of peripheral device. It is a simple and powerful solution that can be utilized for any kind of peripheral device. For example, it could be utilized with a stapling machine which might be set up to put a staple in the upper left-hand corner of every two sheets produced. The current invention provides a needed verification of that setup so that there is assurance that the stapling machine provides the staple at the correct location each two sheets.

SUMMARY OF THE INVENTION

Briefly stated, this invention provides a unique setup number or group of numbers for each job utilizing the peripheral device. These numbers correspond to the setup of that device. When the peripheral device is set up for a particular job, the setup number(s) corresponding to the setup is made available to the data processing system. When a job is run, the setup numbers needed to run the job properly are specified by the job. The system compares the numbers specified by the job with the numbers it receives from the peripheral device which indicate its current setup. If the numbers or group of numbers specified by the job match the numbers indicating current setup, the job is allowed to run. If the numbers do not match, the job is prevented from starting.

To facilitate the use of the current invention in a preferred embodiment, job names are provided to the peripheral device. When setting up the device, the machine operator is provided a list of job names on a touch screen display. When the name of a particular job is selected, the peripheral device automatically uses the information contained in the setup(s) needed to perform that job to configure itself, i.e., to position printheads correctly. The setup identification numbers are then made available to the data processing system indicating current configuration. When the job data stream is presented to the data processing system with a request to run the job, the setup identification numbers needed to run the job are also provided to the system. The system has no data informing it as to the meaning of the numbers. The only understanding that the system software has is that the numbers must match before the job can run. As a consequence, this technique can be used with any type of peripheral device indicating any kind of desired setup; a simple but powerful solution. Moreover, only a minimal change is needed in system software to accomplish the task as will become apparent from the detailed description.

BRIEF DESCRIPTION OF THE DRAWING

The invention is set forth in detail below with reference to the accompanying drawing, a brief description of which follows.

DETAILED DESCRIPTION

When reference is made to the drawing, like numerals indicate like parts and the structural features in the various figures.

Figures 1, 2:
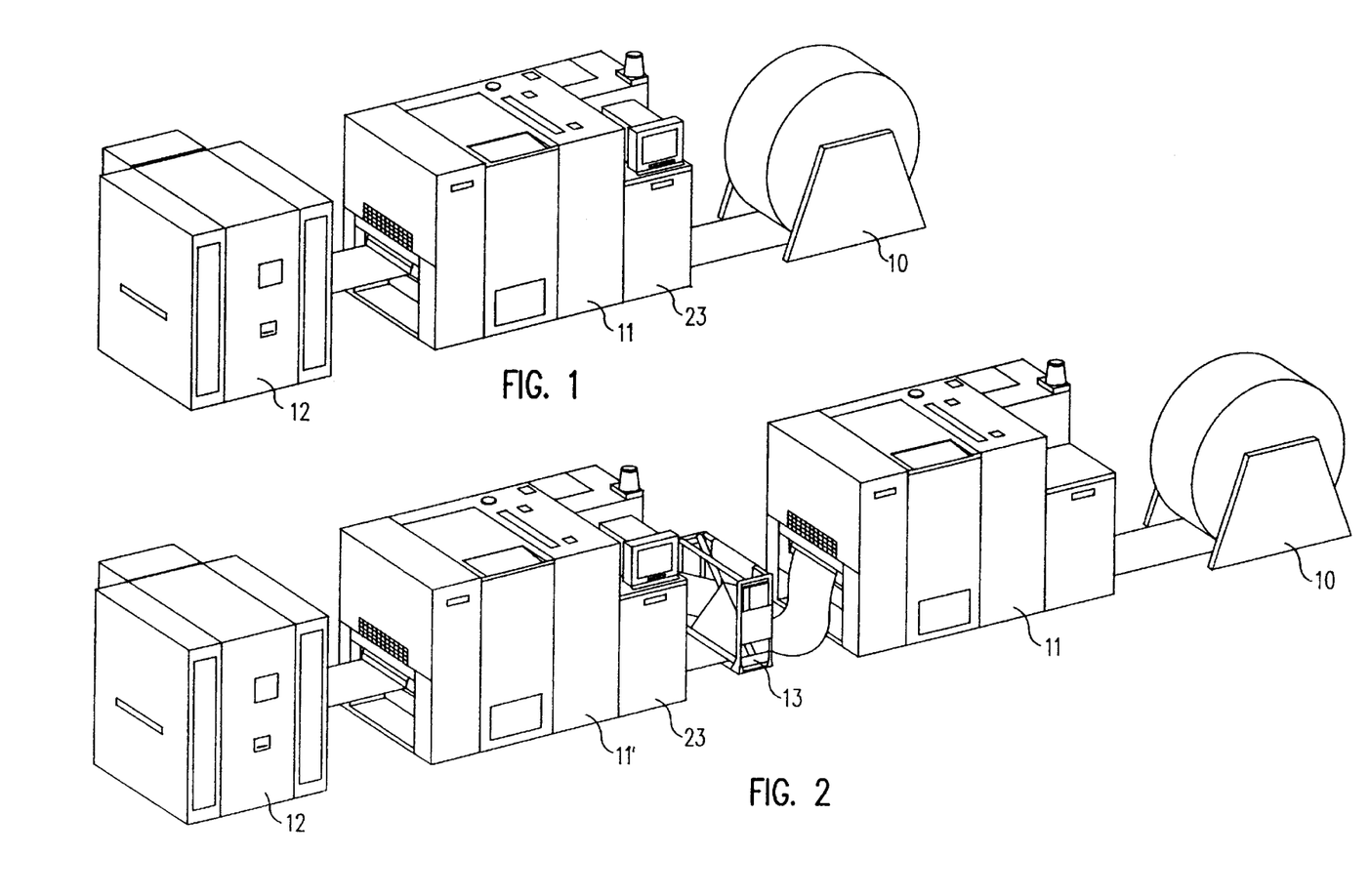
FIG. 1 shows a simplex printer line with a spot color printer positioned to add highlight coloring to the output of a production printer.
FIG. 2 shows a duplex printer line with a spot color printer positioned to add coloring to the output of the printers.

As mentioned above in the background of the invention, a spot color printer is utilized as the peripheral device in illustrating an environment in which the invention is useful. FIG. 1 shows a roll of form paper 10 which is unwound and sent to the printer 11. Printer 11 is typically a high speed black and white printer such as the IBM 3900 printer which prints on one side of the paper and sends it on to a post-processing device 12 which in this case is a spot color printer. The printer 11 is controlled by control unit 23. FIG. 2 shows a duplex configuration which is the same as FIG. 1 except that a flipper 13 is placed on the output of printer 11, so that the paper is turned over and sent to printer 11' for printing on the reverse side of the paper. In that manner, two printers are utilized to produce printing on both sides of the input paper. The spot color printer 12 is located on the output of the printer 11'. Should spot color printer 12 have the capability of printing on only one side of the paper, it would require two spot color printers to add color to both sides of the paper.

Figure 3:
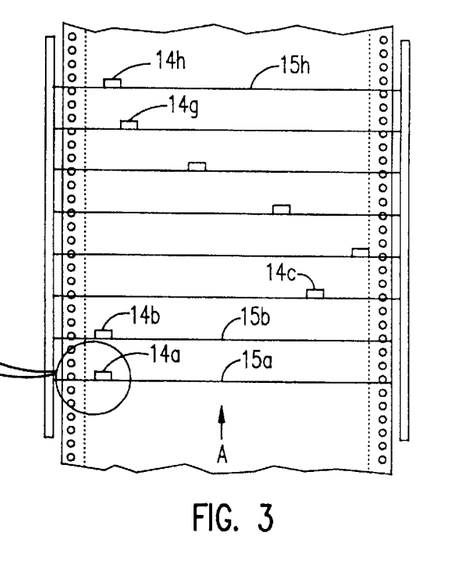
FIGS. 3 and 3A show the position of the printheads in the spot color printer relative to the direction of paper motion.

As mentioned above, the particular spot color printer chosen to illustrate the invention has eight ink-jet printheads to place color on the printed page. Each printhead is mounted on its own printhead carriage assembly, and before a print job is run, the printheads must be moved along tracks to pre-defined positions so that color is imparted to the paper at the correct location. FIG. 3 shows the direction of paper motion A as the paper moves through the spot color printer. Eight movable printheads 14a–14h are located on tracks 15a–15h. Each printhead with its carriage assembly is mounted on a separate track and can be moved along the track across the direction of paper motion from one side of the paper to the other. In that manner, any one of the eight printheads can be located at any position on the paper to color a swath.

Figure 3A:
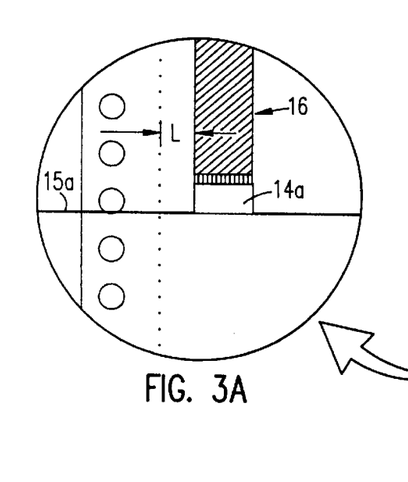

Printhead locations for a print job are chosen so that all color picture elements (pels or pixels) contained in the print job can be printed. FIG. 3A shows a single printhead 14a with the shaded area 16 showing the color coverage area made possible by the printhead's current location. The location L of the first jet of the printhead from the left edge of the form defines the location of all the printhead jets. As mentioned above, each printhead contains 96 ink-jet nozzles with the capability of covering 0.4 inch, i.e., 10.16 mm, 2.4 picas or 28.8 points. Any pels in the printhead job data stream within this coverage area can be printed in color. In FIG. 3A, all jets of printhead 14a are in use.

Printheads can be positioned such that their coverage areas abut one another. In this manner, text or images requiring more than 96 pels width can be printed. FIG. 3 shows printheads 14g and 14h in an abutting coverage relation.

Each printhead is capable of printing one color. Printheads can be positioned so that their coverage areas overlap so that multiple color images can be printed. FIG. 3 shows printheads 14a and 14b in overlapping coverage.

Before a print job is initiated, printheads are automatically moved under the control of the spot color printer to the printhead location for that print job. Printhead locations will remain fixed for the duration of the job. After the print job completes, the printheads can be moved to new locations for the next print job.

Any text image or graphical elements must be within the coverage area of a printhead or group of printheads in order to be printed in color. Collectively, all the printhead locations necessary to print a job are part of the job setup. The job setup informs the spot color printer where to move the printheads and what ink colors are required. Such job setup information is entered into permanent storage in the spot color printer. Every time that job is run, the spot color printer uses the setup information recalled from permanent storage to properly position the printheads containing the proper ink.

Figure 4:
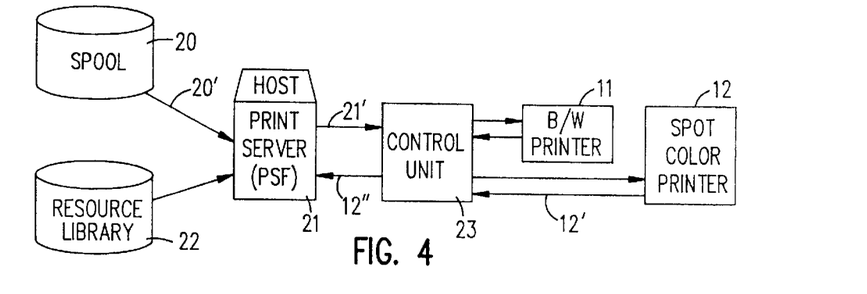
FIG. 4 is a block diagram of the system.

FIG. 4 is a block diagram of the system which controls the print job. Print data may be stored on a spool 20 and be provided in data stream 20' to the print server 21 at print request time. Various resources may be located in a resource library 22. These resources are also made available to the print server 21 when they are needed to complete the print job. The print server 21 produces a print data stream 21' which is sent to a control unit 23. The control unit is a raster image processor producing bitmaps for black and white printing which are sent to the black and white printer 11 while bitmaps of the spot color are sent to the spot color printer 12. Each different color has its own bitmap which the spot color printer presents to the printhead(s) having that color ink.

Figure 5:
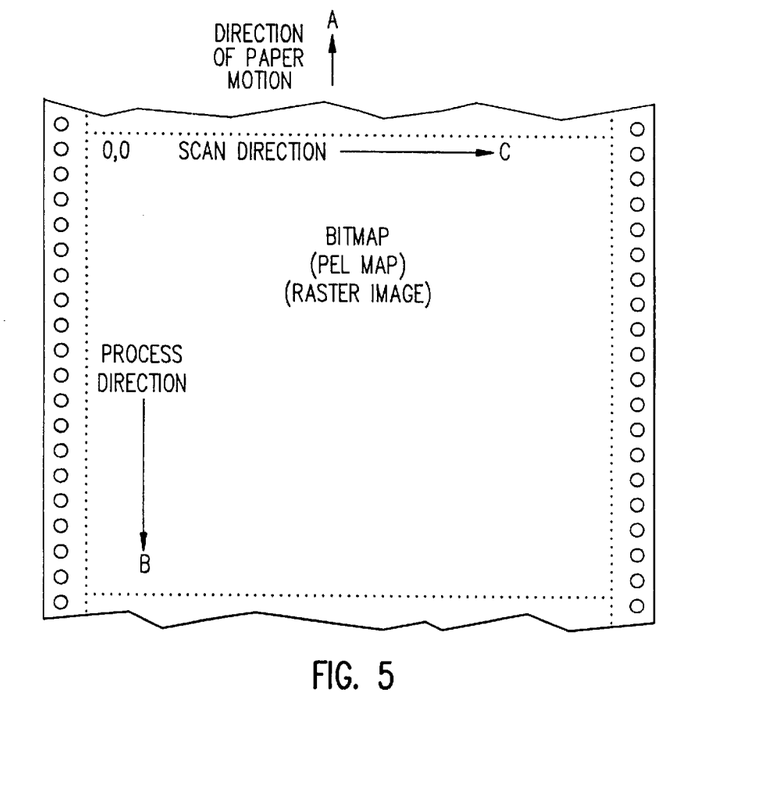
FIG. 5 illustrates bitmap orientation.

A bitmap is a two-dimensional array of 0's and 1's. The origin (0,0) is the location where scan direction and process direction start for the page being printed. FIG. 5 shows bitmap orientation with the process direction B shown opposite (parallel) to the direction of paper motion A while the scan direction C is at 90° (perpendicular) to directions A and B. Each bitmap is a full size depiction of the page to be printed wherein each zero may represent a blank pel and each one may represent a pel to be printed. Bitmaps are sometimes referred to as a pel map or a raster image. The combination of a bitmap for printer 11 to provide black printing; a bitmap for printer 12 to provide a first highlight color; a bitmap for printer 12 to provide a second highlight color; and another bitmap for printer 12 to specify a third highlight color can be used to print a page with black text and three highlight colors. With colored ink that allows the black text to show through, black text can be highlighted. The spot color printer 12 may also be used to print colored text. In Advanced Function Printing (AFP)systems, a product of IBM Corporation, the page printed may be a combination of text, image, graphics and bar code data. Any of these data types can be printed with the highlight capabilities of the spot color printer.

Figure 6:
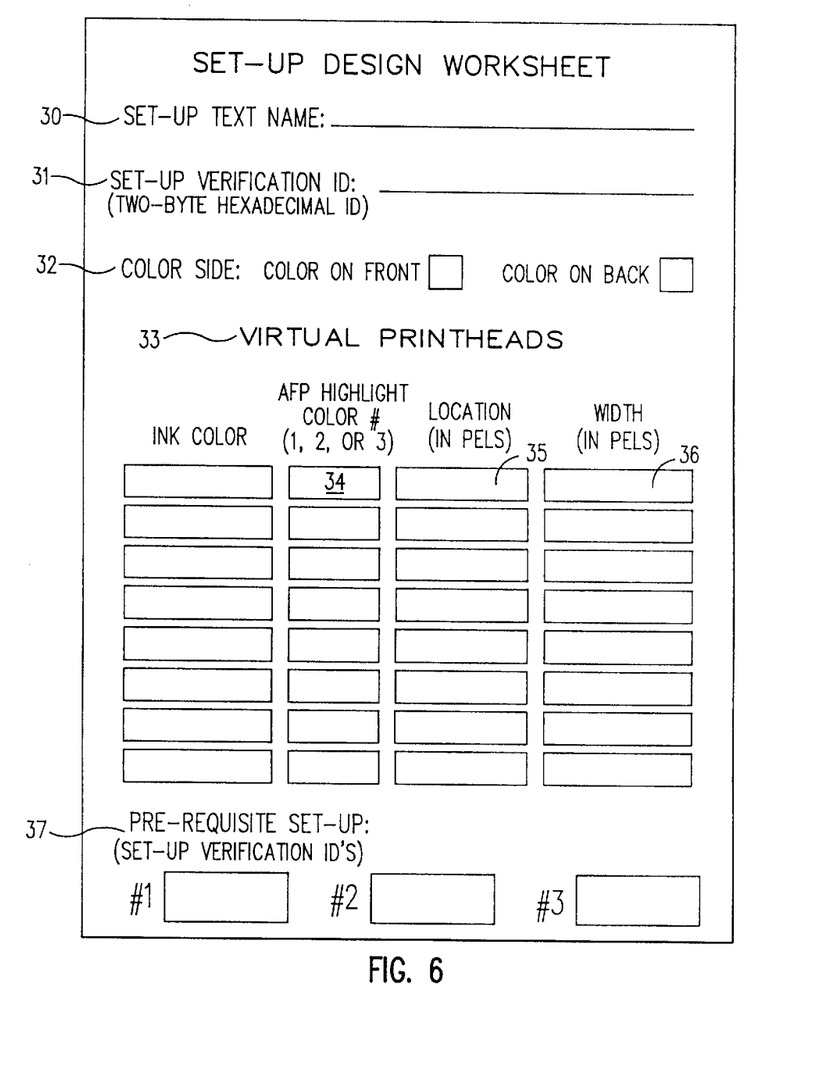
FIG. 6 is an example of a Setup Design Worksheet that could be used by the application programmer to specify color and virtual printhead position.

FIG. 6 shows a setup design worksheet which illustrates the data to be provided to the spot color printer in order to implement the invention. The application programmer who designs the job will fill out the setup design worksheet, or something similar, to provide a setup text name 30 which is usually the name of a job to be run, for example, "monthly billing." To implement the invention, a setup verification identification number 31 is provided which in the illustration is a two byte hexadecimal number. The application programmer will indicate whether the color is to be provided on the front of the paper or on the back. Since the spot color printer illustrated in FIGS. 1 and 2 is a simplex device, color pels can be printed on only one side of the paper during a print job. The color side parameter 32 indicates whether highlight color pels are found on the front or the back of the paper for print jobs using this setup.

The virtual printhead 33 shown in FIG. 6 is a conceptual printhead that enables the programmer to define the ink color, the bitmap number, the printhead location and the printhead width (swath) desired on the paper without concerning himself with what physical printhead is moved to what location in order to meet the requirements of the job. The term virtual is used because the spot color printer decides which physical printhead or printheads are to be used to fulfill the color requirements of the virtual printhead. The spot color printer moves physical printheads at the time the setup is loaded to the correct location.

The bitmap number 34 corresponds to Advanced Function Printing (AFP) highlight color number 34. In this embodiment of the invention, the host application can designate up to three highlight colors. The bitmap number or highlight color number 34 specifies which of the three color bitmaps is used to send pels to the virtual printhead. Only that bitmap will be searched for pels to print by that virtual printhead. The printhead location 35 shown in FIG. 6 is the parameter that specifies the distance from the origin to the first jet of the virtual printhead. The printhead width designation 36 in FIG. 6 is the width of the virtual printhead in pels (or jets.) The spot color printer automatically computes how many physical printheads are required based on the number of jets needed by the virtual printhead specified by the programmer.

A print job may require information from several setups in order to specify the location of all printheads required to print the job. For example, many different jobs may utilize a setup that provides color for the corporation logo. A setup design to provide that color may be a pre-requisite setup 37.

Before a job is to be run, the printer operator may view a display of the various jobs for which setups have been entered into permanent memory. One of the jobs appearing on that list will be the job about to be run, for example, "monthly billing." If the display is a touch screen device, the operator touches the name "monthly billing" which causes the spot color printer to automatically configure itself with the physical printheads properly positioned to run the "monthly billing" job. Since the print job may require information from pre-requisite setups, all of those setups and their verification identification numbers are included in the permanent memory of the spot color printer in relation to the job "monthly billing."

All setup verification identification numbers to run the job "monthly billing" are sent to the system, indicating to the system a current setup of the spot color printer. In the system of FIG. 4, the spot color printer 12 transmits the two byte setup verification numbers over line 12' for all currently loaded setups to the control unit 23. The control unit 23, in turn, transmits those numbers over line 12" to print server 21 when requested.

When the print job "monthly billing" is submitted to print server 21 for printing, it will contain a list of all the setup verification numbers required for the print job. The print server 21 compares the setup verification numbers for the print job to the list of setup verification numbers currently loaded in the spot color printer. If all the setup verification numbers are loaded properly, the job is submitted for printing; if not, the job is terminated.

In a preferred embodiment of the invention, the print server 21 is the Print Service Facility (PSF) produced by the International Business Machines Corporation (IBM), Armonk, N.Y. The Print Service Facility is system software that organizes the data stream presented to the printer by pages to be printed, thus enabling the utilization of all points addressable page printers. In the system illustrated in FIG. 4, the document to be printed is stored on the spool 20. The document is organized by pages with the page content present in a stored data stream. The data stream is a highly ordered data stream consisting of self-defining structured fields organized according to the IBM generated architecture entitled "Mixed Object Document Content Architecture" (MO:DCA). Incorporated herein by reference is the reference manual entitled "Mixed Object Document Content Architecture Reference," SC31-6802-03, Fourth Edition, August 1994, available from the IBM Corporation, Information Development Department 588, Post Office Box 1900, Boulder, Colo. 80301-9191. A data stream 20' organized according to MO:DCA architecture is accepted as input by the Print Service Facility 21 which then develops the Intelligent Printer Data Stream 21' for driving the control unit 23, and through the control unit, the bitmaps for the printers 11 and 12. In the MO:DCA architecture, pages presented for printing contain not only the data stream document content received from spool 20, but also the directions and content of resources located in the resource library 22. One of the resources located in library 22 is termed an overlay, and is used to overlay the document content from spool 20. For example, an overlay of the U.S. Income Tax Form 1040 might be present in library 22 and that form overlay is included with the text content from spool 20 to provide the final presentation of the page from PSF 21 to the control unit 23. If desired, the color could be placed in an overlay.

Another resource located in library 22 is entitled a "form definition." The form definition or form map aids in the presentation of the print material in the proper page format to the printer. The form definition is used to provide information such as whether the user desires simplex or duplex prints, whether the printing is to be two up or four up, that is, two pages per sheet or four pages per sheet, whether the printing should include overlays, etc. The users of the system illustrated in FIG. 4 might frequently have libraries of form definitions which are utilized for jobs such as the "monthly billing." The application or system programmer who is in charge of the monthly billing job will select the proper form definitions for that monthly billing and make reference to those form definitions at print request time in order that PSF will retrieve the designated form definitions from the resource library 22. In that manner, the job "monthly billing" might be run in a simplex format on a first printing and a duplex format on a subsequent printing depending on which form definition 15 called at print request time. However, if a particular form definition is required for the document data stream located on spool 20, then that form definition would always be used in printing the job and if simplex is designated, the job will always run in simplex mode.

To implement the current invention, a provision has been added to the form definitions within MO:DCA architecture in order to specify one or more two byte hexadecimal (hex or X) numbers which identify the setups to be used or spot color information on each page of the job. If the two byte hex numbers are not provided, then there will be no setups required for the job, and the setup for the placing of spot color will not be assured. If the form definition includes the two byte hex numbers to identify setups for the peripheral device, then before PSF presents the job to the control unit, the current setup of the post-processor is compared with the numbers in the form definition, and if they correspond, the job can print. If they do not correspond the job will not print, and instead, will be returned to a job queue until the proper setup can be achieved.

It should be carefully noted that a two byte hex number corresponds to a setup on the spot color printer but has nothing to do with the specification of the color itself or the location and width of the printheads, virtual or physical. If highlight colors are to be used on a document, the highlight colors must be specified in the MO:DCA data stream located on spool 20 or in an overlay. That data stream does not include the physical ink color, the virtual printhead locations or the virtual printhead widths. The form definition and the two byte hex numbers in the form definition have nothing to do with the ink color, the printhead location, or the printhead widths. The function of the two byte hex numbers is solely to assure the user of the system that the spot color printer is properly setup to carry out the color printing included in the bitmap. As previously mentioned unique two byte hex numbers in the form definition can be used to assure any type of setup of any kind of peripheral device.

The various resources, including the form definition located in the library 22, are also organized according to the MO:DCA architecture. Consequently, they are organized as a highly structured data stream consisting of self-defining structured fields. Within the form definition, a group of structured fields are entitled the "Medium Modification Control (MMC)" structured fields. The MMC fields specify modifications to the medium (in the case of a printer, the physical sheet of paper.) Thus, it is within the MMC that various nonprinting operations are established. An example is to provide a fixed perforation cut, that is, if the print line of machinery includes a perforation machine, the form or sheets being produced by the printer can have a perforation cut applied to it at a fixed location on the physical sheet. Also located by MMC use would be a fixed separation cut where forms are cut into separate sheets at a fixed location on the physical medium. It is within the MMC that a particular input source to a cut sheet printer might be specified, for example, whether the printer is to take input sheets from a first bin or a second bin. Also, it is within the MMC fields that the requirement of simplex or duplex is stated for the particular job being presented to the printer.

In order to implement the current invention, an additional Medium Modification Control keyword has been provided within the structured field. That keyword, or in the actual implementation, two keywords, specify the setup identification number required to run the job. The first keyword specifies the high-order byte of the two byte hex setup number, the second keyword supplies the low-order byte of that number.

Figure 7:
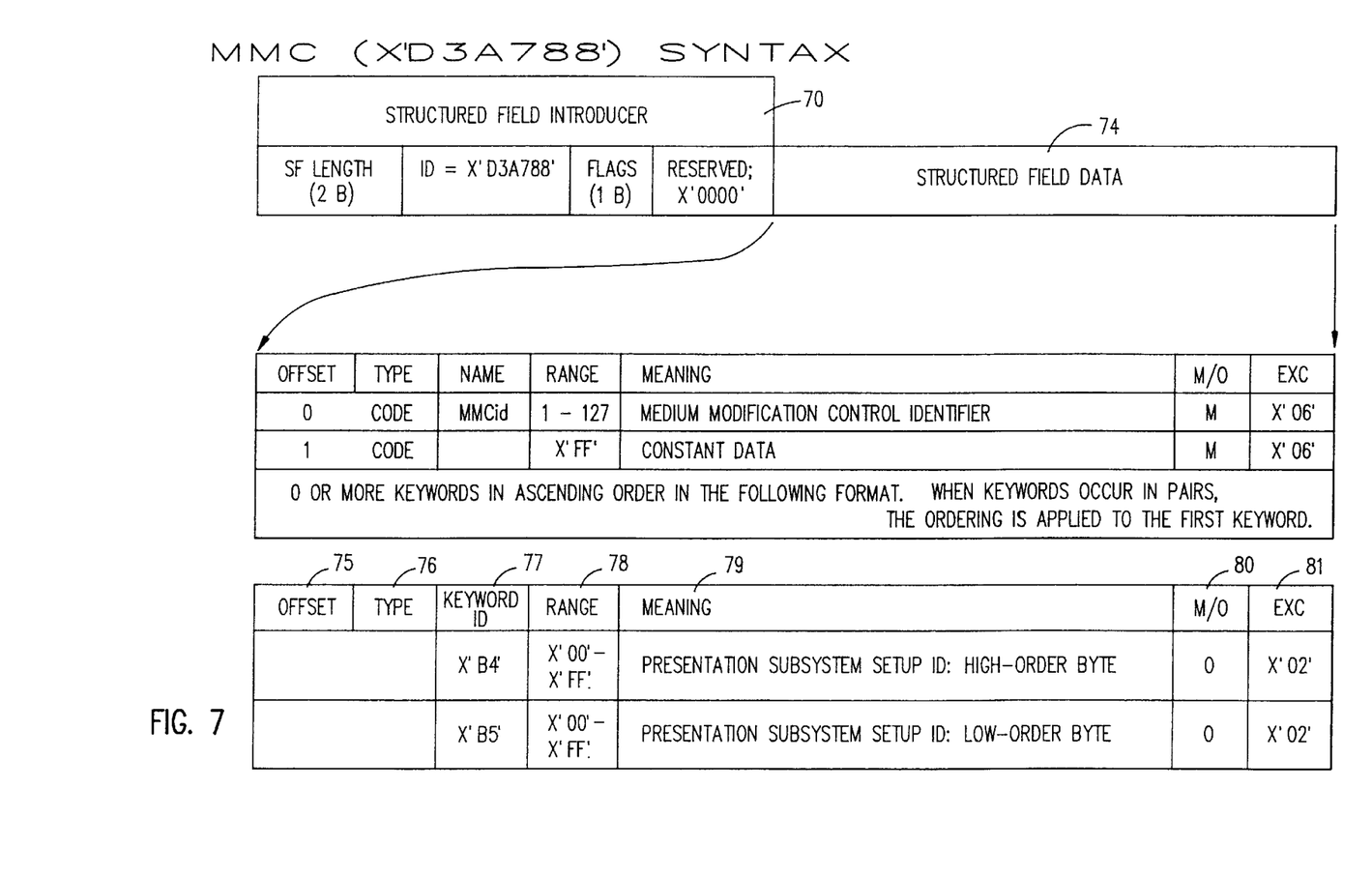
FIG. 7 shows the syntax of the of the Medium Modification Control structured fields of the Mixed Object Document Content Architecture (MO:DCA).

FIG. 7 shows the syntax of the Medium Modification Control structured field located in the form definition. The structured field introducer 70 is comprised of the length 71 of the field, the identification 72 of the field as a Medium Modification Control, and flags 73. Following the introducer is the structured field data 74 which is comprised of an offset 75 from the beginning of the structured field data, the data type 76 and ID 77 of the keyword parameter, together with the range 78 and meaning 79 of the keyword. In the case of setup identification numbers, the high-order byte is identified by the keyword 77 as X'B4' while the low-order byte is identified by the MMC keyword X'B5'. When the keyword B4 is used, it must be paired with a B5 keyword in order to completely specify the two byte presentation sub-system setup verification identification number. The keyword pair may appear multiple times to identify the presence of more than one setup needed to perform the printing. All of these keyword pairs are compared by PSF 21 with the setup verification numbers generated by the presentation sub-system (peripheral.) If all setup verification numbers are found to be currently active in the peripheral device, the presentation is allowed to proceed. If there is no match, the required setup is not active, and the presentation is terminated.

FIG. 7 shows M/O data 80 and exception data (Exc) 81 at the end of the structured field. M/O refers to whether the keyword is mandatory or optional, while the exception data contains a code indicating the type of exception that the keyword may generate. The application creating the data stream is responsible for producing a valid MO:DCA data stream, and the application using the MO:DCA data stream is responsible for preserving a valid format. Nonetheless, exception conditions may arise. A valid MO:DCA data stream is one that does not violate the architecture. A MO:DCA data stream is in violation of the architecture when its structure or contents do not conform to the requirements of the architecture. Since the cause of an architecture violation cannot be determined when an application interprets a data stream, all architecture violations are handled as exception conditions. Some exception condition examples include a code indicating that a required structured field is missing, or that a required parameter is missing, or that there that is an unacceptable parameter value, or inconsistent parameter values. Each of these exceptions have a specific code as indicated on page 60 in the MO:DCA reference manual which has been incorporated herein by reference.

It may be noted that in the MO:DCA architecture, a page is an object that contains the data objects to be presented. Data objects may be a text object, a graphics object, an image object, or a bar code object. Any combination of these objects may be present on a single page to be printed. A page establishes its own environment and is independent of any other page in the document. In the data stream, a page is delimited by Begin Page and End Page structured fields.

Resource objects may be included within a page to be printed. Such objects are considered to be resource objects when they are explicitly referenced from the document instead of being directly included in the document. Resource objects may reside in external resource libraries such as library 22 in FIG. 4 or in resource groups external to the document, or in resource groups internal to the document. Resource objects include font objects, overlay objects, page segment objects, and print control objects. Print control objects are resource objects that are used to control the presentation of pages in a document on the physical medium which, in the case of a printer, are forms or sheets in a printer. Print control objects are known as form maps or form definitions and include medium maps. The form map is a print control resource object comprised of structured fields including an optional environment field that defines the print environment for the form map and one or more medium map resource object fields that are invocable on document and page boundaries and that specify a complete set of print controls. The form map is selected for controlling document presentation when the document print request is generated. The medium map is a print control resource within the form map object that contains the print control parameters for generating the physical media. Print control parameters may be either medium level controls or page level controls. Medium level controls are controls that affect the medium, such as the specification of overlays, size, orientation, copies, simplex or duplex, and media source and destination selection. Page level controls are controls that affect the pages that are placed on the medium such as the specification of page modifications, page position and page orientation. The Medium Modification Control (MMC) structured field is a media level control and, as described above, can include the identification setup verification numbers of this invention.

A medium map can be invoked by name on any page boundary in a document. That is done by including an invoke media map structured field in the document data stream.

As indicated above, the print job is provided to PSF in the MO:DCA data stream. The programmer, who writes the application for printing the text, graphics, images, and bar codes present in the document, customarily uses a formatter to generate the MO:DCA data stream. Such a formatter is the Document Composition Facility (DCF), a product of the IBM Corporation. In using such a formatter, the programmer places control codes directly on the page to be printed and presents it to DCF. With those controls, DCF generates the MO:DCA data stream in the required structured field format which specifies the page to be printed leaving nothing to the imagination. If the document is to include highlight spot colors, the programmer designates within the data stream the highlight color of the data to be printed. Setup identification numbers are provided by the programmer in a form definition in the Medium Modification Control. The data stream comprising the job is placed on a spool 20 so that it is available to the host whenever it is desired to run the job. The form definition is placed in a resource library 22 so that when a job request is supplied, the PSF will retrieve the form definition, and thereby obtain the setup verification numbers corresponding to the required color and virtual printhead positions. PSF, however, does not understand the meaning of the verification numbers. PSF only understands that those numbers must be compared to setup numbers received from the peripheral device before it can allow the job to run.

Figure 8:
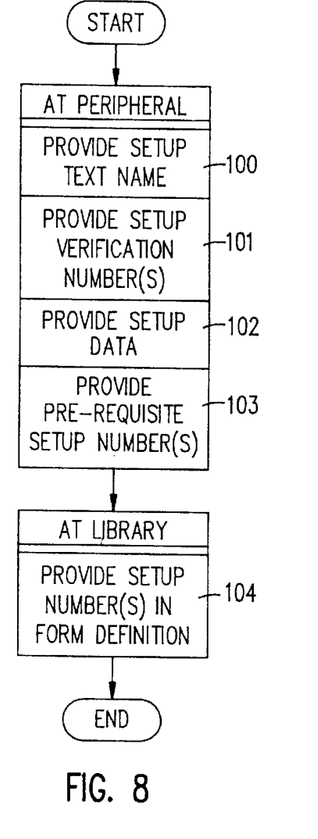
FIG. 8 provides a flowchart for entering setups at the spot color printer and at a resource library.

FIG. 8 illustrates these activities. At the peripheral device, printer 12, the programmer enters at step 100 a setup text name 30 (FIG. 6). At step 101 the setup verification number or numbers 31 (FIG. 6) are entered into printer 12. The setup data 32, 34, 35, and 36 (FIG. 6) corresponding to those verification numbers are provided at step 102. Any pre-requisite setup numbers 37 (FIG. 6) that are needed for the job are established at step 103. In that manner, the spot color printer receives all of the information it needs to verify that it does have the ink color requested in printheads which it can position in accordance with the design worksheet. Should the spot color printer not be able to set itself up according to the data entered, the programmer will be so informed on a display at the peripheral device. At step 104 the programmer also provides the setup numbers 30 and 37 in a form definition in the resource library available to the host.

Figure 9:
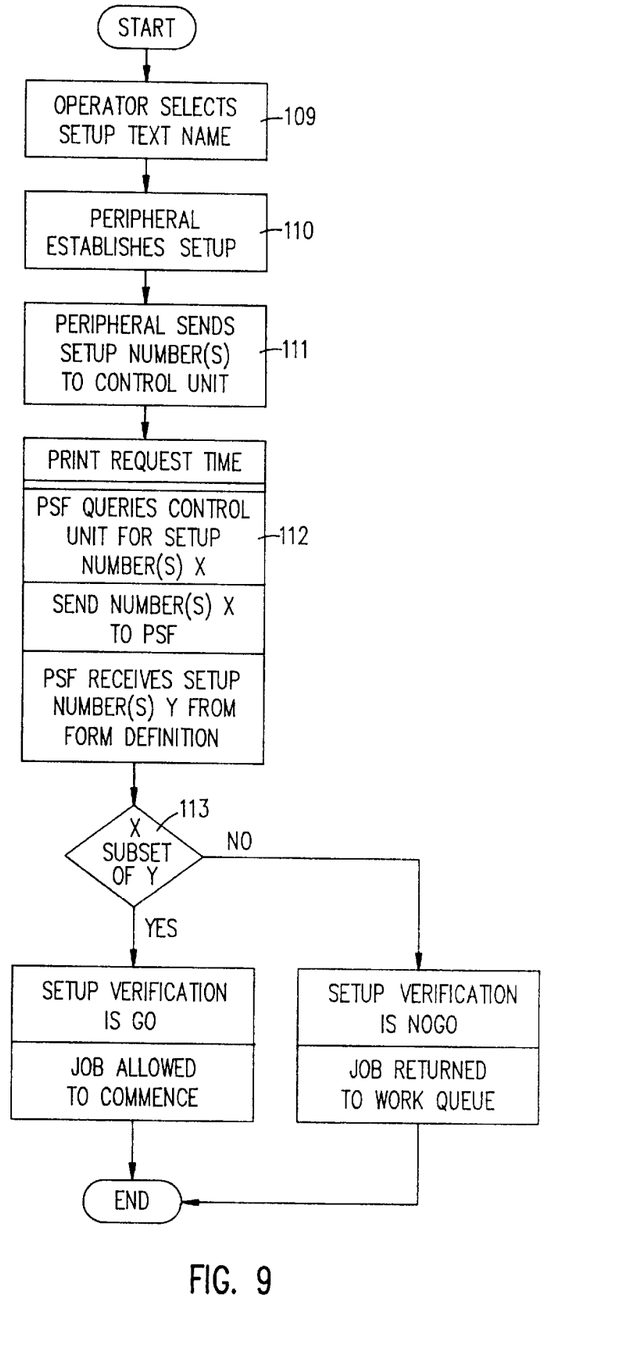
FIG. 9 is a flowchart of the process followed in starting a job which requires the use of the invention.

FIG. 9 shows the procedure followed by the system in accordance with this invention. At step 109 a machine operator selects the setup text name at the display associated with the spot color printer 12. At step 110 that printer automatically establishes the setup corresponding to the text name by moving appropriate printheads to required positions. At step 111 the peripheral device sends the setup verification numbers X to the control unit. Note that the setup verification numbers X include the particular setup numbers 30 corresponding to the text name for the job to be run that were entered at the peripheral device in step 101, and also the pre-requisite setup numbers 37 required for the job entered at the peripheral device at step 103. Other setup numbers not required for the current job but currently valid by virtue of the current printhead locations are also included in X. At step 112 PSF queries the control unit for setup numbers X. These numbers are sent from the control unit to PSF. This query occurs at print request time for the job to be printed. Also at that time, PSF invokes the form definition required to run the job and thereby receives the numbers Y for the job from the form definition. At step 113 PSF compares the numbers Y received from the form definition with the numbers X received from the control unit. If Y is a subset of X, the setup verification is enabled and the job may print. If not, the job is returned to the work queue.

It should be noted that a particular setup may be hidden from the machine operator. In such case, the machine operator will be unable to select the setup from a display. However, such a setup can be included in jobs by the programmer as a pre-requisite setup at step 103. Hidden setups can be used to add a highlight coloring of the company logo which always appears in the same place on a wide variety of documents printed. In that manner, the pre-requisite setup number may be used on a wide variety of jobs in a manner that is completely transparent to the machine operator.

Figure 10:
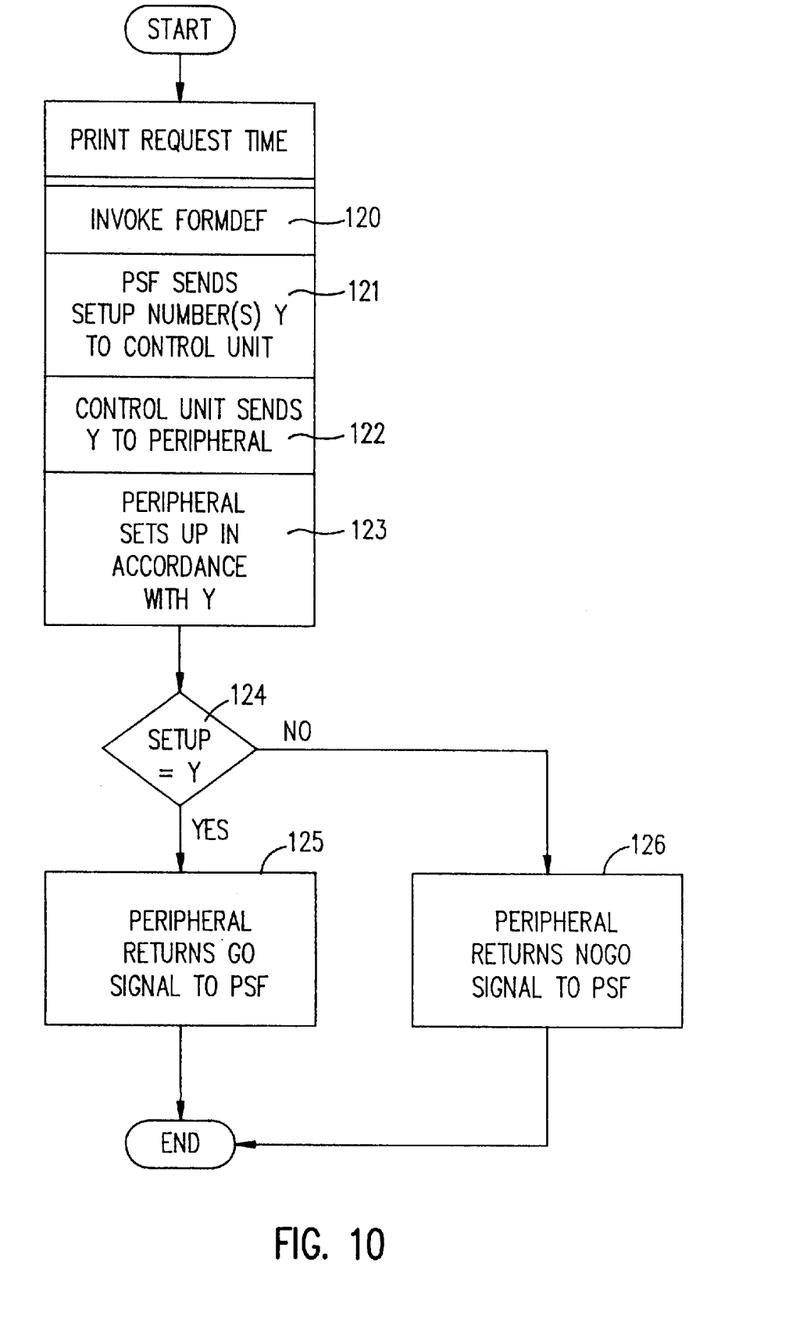
FIG. 10 is a flowchart of an alternative procedure to that of FIG. 9.

A second preferred embodiment of the invention is shown in FIG. 10. Once again, the setup to establish the verification numbers is shown in FIG. 8. In FIG. 10 at print request time, the form definition is invoked at step 120. At step 121 PSF sends the setup numbers Y to the control unit and from there to the peripheral device as shown in step 122. At step 123 the peripheral device sets itself up in accordance with the setup numbers Y and when that has been accomplished as shown at step 124 the peripheral device returns a go signal at step 125 to PSF. If the peripheral device was unable to set itself up properly, it returns a nogo signal to PSF as shown in step 126.

A variation to the procedure shown in FIG. 10 has the setup identification numbers transferred to the peripheral device as shown in steps 120 through 122. Instead of the peripheral device setting itself up in accordance with those numbers as shown in step 123, instead a message is provided on the display of the peripheral device providing instructions to the operator to set the peripheral device up properly. When the device has been set up properly, the operator would then provide an indication of that back to the system. In this variation the accuracy of the setup is dependent upon the machine operator, and therefore may not be preferred for some applications.

A variation of the procedure shown in FIG. 9 is for PSF to route jobs with the same required setups to a specific queue. That queue would not be released for print until the machine operator has checked that the required peripheral device configuration has been set up. Once again, this variation is dependent upon the machine operator in checking the setup. However, PSF will verify that the setups required by the queue are supported by the peripheral device in accordance with steps 111–113.

It should be observed that the control program which automatically sets up the spot color printer in accordance with the instructions entered into it from the design worksheet, FIG. 6, is a much more complex program than the relatively simple programming changes in PSF and in the form definition required to implement the invention. What has been accomplished with the invention is to remove all peripheral explicit complications from the system software and thereby out of the transmitted data stream. Therefore, the system software and data stream are valid even if, at some future time, the operational characteristics of the peripheral device are changed. With the invention, PSF has no role in instructing the spot color printer as to the location of its eight printheads and has no information about those printheads or the ink. Thus, PSF has, with this invention, the assurance that the spot color printer is set up properly without understanding any of the complexities involved in achieving the setup. Use of this invention moves the complexities of controlling the setup of peripheral devices to the peripheral device thus providing the system with a technique which can handle any kind of complex peripheral device in a simple fashion.

While the invention has been described above with respect to a specific embodiment, it will be understood by those skilled in the art that various changes in form and detail may be made therein without departing from the spirit and scope of the invention. For example, the invention has been illustrated by a spot color printer as a post-processor. The invention is applicable to a pre-processor and to peripheral devices other than spot color printers. Again, changes in form and detail ma,y be made without departing from the spirit and scope of the invention.

What is claimed is:

1. A method of assuring verification of the proper configuration of a peripheral device to a data processing system so that said system terminates a job before it starts if assurance is not achieved, said method placing the complexities of peripheral configuration at the peripheral device, thus assuring valid system software and data stream regardless of the type of peripheral device and regardless of future changes in peripheral device capabilities, comprising the machine implemented steps of:

providing for entering into the memory of said peripheral device a first configuration needed to properly perform a first job and a first verification number(s) corresponding to said first configuration;

providing for the placement of said first verification number(s) into a resource object available to said system;

at job request time, providing for the retrieval of said first verification number(s) from said resource object;

providing for the setting up of said peripheral device in accordance with said first verification number(s);

providing for the ascertainment of whether said peripheral device is properly configured; and providing for the termination of said job if said peripheral device is not set up properly;

wherein the step of providing for the ascertainment of whether said peripheral device is properly configured further includes the steps of:

providing for the transmittal of a list of verification numbers corresponding to the current setup of said peripheral to said system; and providing for the comparison of said first verification number(s) retrieved from said resource object to the transmitted list of verification number(s) and if said first verification number(s) retrieved from said resource object are found to be a subset of the number(s) in said transmitted list, allowing said first job to commence its run, but if a match is not found, terminating said first job.

2. The method of claim 1 wherein said resource object includes print control objects comprised of structured fields containing print control parameters including medium level controls, and wherein said step of providing for the placement of said first verification number(s) into a resource object includes the step of:

providing for the placement of said first verification number(s) into the structured data field corresponding to the presentation sub-system (peripheral) setup identification.

3. The method of claim 2 wherein said presentation sub-system identification includes a keyword corresponding to a configuration of a spot color printer.

4. The method of claim 3 wherein said first verification number(s) identify a spot color printer setup for producing highlight color and the location and width of a virtual printhead to define the location of picture elements (pels) in said highlight color relative to the medium.

5. The method of claim 4 wherein said spot color printer is an ink jet printer with a plurality of physical printheads which are positioned by said spot color printer in accordance with said first verification number(s) to provide highlight color on the medium in accordance with the virtual printhead data corresponding to said first verification number(s).

6. A method of assuring verification of the proper configuration of a peripheral device to a data processing system so that said system terminates a job before it starts if assurance is not achieved, said method placing the complexities of peripheral configuration at the peripheral device, thus assuring valid system software and data stream regardless of the type of peripheral device and regardless of future changes in peripheral device capabilities, comprising the machine implemented steps of:

providing for entering into the memory of said peripheral device a first configuration needed to properly perform a first job and a first verification number(s) corresponding to said first configuration;

providing for the placement of said first verification number(s) into a resource object available to said system;

at job request time, providing for the retrieval of said first verification number(s) from said resource object;

providing for the setting up of said peripheral device in accordance with said first verification number(s);

providing for the ascertainment of whether said peripheral device is properly configured; and providing for the termination of said job if said peripheral device is not set up properly;

wherein the step of providing for the setting up of said peripheral device in accordance with said first verification number(s) further includes the steps of:

providing for the transmittal of said first verification number(s) retrieved from said resource object to said peripheral device for setting up said device in accordance with said first verification number(s);

providing for the transmittal of a list of verification numbers corresponding to the current setup of said peripheral to said system; and wherein the step of providing for the ascertainment of whether said peripheral device is properly configured further includes the step of:

providing for the comparison of said first verification number(s) retrieved from said resource object to the transmitted list of verification number(s) and if said first verification number(s) retrieved from said resource object are found to be a subset of the number(s) in said transmitted list, allowing said first job to commence its run, but if a match is not found, terminating said first job.

7. The method of claim 6 herein said resource object includes print control objects comprised of structured fields containing print control parameters including medium level controls, and wherein said step of providing for the placement of said first verification number(s) into a resource object includes the steps of:

providing for the placement of said first verification number(s) into the structured data field corresponding to the presentation sub-system (peripheral) setup identification.

8. The method of claim 7 wherein said presentation sub-system identification includes a keyword corresponding to a configuration of a spot color printer.

9. The method of claim 8 wherein said first verification number(s) identify a spot color printer setup for producing highlight color and the location and width of a virtual printhead to define the location of picture elements (pels) in said highlight color relative to the medium.

10. The method of claim 9 wherein said spot color printer is an ink jet printer with a plurality of physical printheads which are positioned by said spot color printer in accordance with said first verification number(s) to provide highlight color on the medium in accordance with virtual printhead data corresponding to said first verification number(s).

11. A method of assuring verification of the proper configuration of a peripheral device to a data processing system so that said system terminates a job before it starts if assurance is not achieved, said method placing the complexities of peripheral configuration at the peripheral device, thus assuring valid system software and data stream regardless of the type of peripheral device and regardless of future changes in peripheral device capabilities, comprising the machine implemented steps of:

providing for entering into the memory of said peripheral device a first configuration needed to properly perform a first job and a first verification number(s) corresponding to said first configuration;

providing for the placement of said first verification number(s) into a resource object available to said system;

at job request time, providing for the retrieval of said first verification number(s) from said resource object;

providing for the setting up of said peripheral device in accordance with said first verification number(s);

providing for the ascertainment of whether said peripheral device is properly configured; and providing for the termination of said job if said peripheral device is not set up properly;

wherein the step of providing for the ascertainment of whether said peripheral device is properly configured further includes the steps of;

providing for the routing of said first job to a queue of jobs with the same required setups;

providing for the transmittal of a list of verification numbers corresponding to the current setup of said peripheral to said system; and providing for the comparison of said first verification number(s) retrieved from said resource object to the received list of verification number(s) and if said first verification number(s) retrieved from said resource object are found to be a subset of the number(s) in said received list, releasing said queue of jobs to commence their run, but if a match is not found, retaining said queue of jobs.

12. A method of assuring verification of the proper configuration of a peripheral device to a data processing system so that said system terminates a job before it starts if assurance is not achieved, said method placing the complexities of peripheral configuration at the peripheral device, thus assuring valid system software and data stream regardless of the type of peripheral device and regardless of future changes in peripheral device capabilities, comprising the machine implemented steps of:

providing for entering into the memory of said peripheral device a first configuration needed to properly perform a first job and a first verification number(s) corresponding to said first configuration;

providing for the placement of said first verification number(s) into a resource object available to said system;

at job request time, providing for the retrieval of said first verification number(s) from said resource object;

providing for the setting up of said peripheral device in accordance with said first verification number(s);

providing for the ascertainment of whether said peripheral device is properly configured; and providing for the termination of said job if said peripheral device is not set up properly;

wherein said resource object includes print control objects comprised of structured fields containing print control parameters including medium level controls, and wherein said step of providing for the placement of said first verification number(s) into a resource object includes the step of:

providing for the placement of said first verification number(s) into the structured data field corresponding to the presentation sub-system (peripheral) setup identification.

13. The method of claim 12 wherein said presentation sub-system identification includes a keyword corresponding to a configuration of a spot color printer.

14. The method of claim 13 wherein said first verification number(s) identify a spot color printer setup for producing highlight color and the location and width of a virtual printhead to define the location of picture elements (pels) in said highlight color relative to the medium.

15. The method of claim 14 wherein said spot color printer is an ink jet printer with a plurality of physical printheads which are positioned by said spot color printer in accordance with said first verification number(s) to provide highlight color on the medium in accordance with the virtual printhead data corresponding to said first verification number(s).

16. Apparatus for assuring verification of the proper configuration of a peripheral device to a data processing system so that said system terminates a job before it starts if assurance is not achieved, said apparatus placing the complexities of peripheral configuration at the peripheral device, thus assuring valid system software and data stream regardless of the type of peripheral device and regardless of future changes in peripheral device capabilities, comprising:

a data processing system;

a peripheral device connected to said data processing system;

means for entering into the memory of said peripheral device a first configuration needed to properly perform a first job and a first verification number(s) corresponding to said first configuration;

a resource object available to said system;

means for placing said first verification number(s) into said resource object available to said system;

means for retrieving said first verification number(s) from said resource object;

means for setting up said peripheral device in accordance with said first verification number(s);

means for ascertaining whether said peripheral device is properly configured; and means for terminating said job if said peripheral device is not set up properly;

wherein said means for ascertaining whether said peripheral device is properly configured further includes:

means for transmitting a list of verification numbers corresponding to the current setup of said peripheral to said system;

means for comparing said first verification number(s) retrieved from said resource object to the transmitted list of verification number(s) to determine whether said first verification number(s) retrieved from said resource object are a subset of the number(s) in said transmitted list; and means for allowing said first job to commence its run.

17. The apparatus of claim 16 wherein said resource object includes print control objects comprised of structured fields having print control parameters including medium level controls, and wherein said means for placing said first verification number(s) into said resource object includes:

means for placing said first verification number(s) into the structured data field corresponding to the presentation sub-system (peripheral) setup identification.

18. The apparatus of claim 17 wherein said peripheral is a spot color printer and wherein said presentation subsystem identification includes a keyword corresponding to a configuration of said spot color printer.

19. The apparatus of claim 18 wherein said first verification number(s) identify said spot color printer setup for producing highlight color and the location and width of a virtual printhead to define the location of picture elements (pels) in said highlight color relative to the medium.

20. The apparatus of claim 19 wherein said spot color printer is an ink jet printer with a plurality of physical printheads which are positioned by said spot color printer in accordance with said first verification number(s) to provide highlight color on the medium in accordance with the virtual printhead data corresponding to said first verification number(s).

21. Apparatus for assuring verification of the proper configuration of a peripheral device to a data processing system so that said system terminates a job before it starts if assurance is not achieved, said apparatus placing the complexities of peripheral configuration at the peripheral device, thus assuring valid system software and data stream regardless of the type of peripheral device and regardless of future changes in peripheral device capabilities, comprising:

a data processing system;

a peripheral device connected to said data processing system;

means for entering into the memory of said peripheral device a first configuration needed to properly perform a first job and a first verification number(s) corresponding to said first configuration;

a resource object available to said system;

means for placing said first verification number(s) into said resource object available to said system;

means for retrieving said first verification number(s) from said resource object;

means for setting up said peripheral device in accordance with said first verification number(s);

means for ascertaining whether said peripheral device is properly configured; and means for terminating said job if said peripheral device is not set up properly;

wherein said means for setting up said peripheral device in accordance with said first verification number(s) includes:

means for transmitting said first verification number(s) retrieved from said resource object to said peripheral device; and means for stimulating said means for setting up said peripheral devices in accordance with said first verification number(s);

wherein said means for ascertaining whether said peripheral device is properly configured further includes:

means for transmitting a list of verification numbers corresponding to the current setup of said peripheral to said system;

means for comparing said first verification number (s) retrieved from said resource object to the transmitted list of verification number(s) to determine whether said first verification number(s) retrieved from said resource object are a subset of the number(s) in said transmitted list; and means for allowing said first job to commence its run.

22. The apparatus of claim 21 wherein said resource object includes print control objects comprised of structured fields having print control parameters including medium level controls, and wherein said means for placing said first verification number(s) into a resource object includes:

means for placing said first verification number(s) into the structured data field corresponding to the presentation sub-system (peripheral) setup identification.

23. The apparatus of claim 22 wherein said peripheral is a spot color printer and wherein said presentation subsystem identification includes a keyword corresponding to a configuration of said spot color printer.

24. The apparatus of claim 23 wherein said first verification number(s) identify said spot color printer setup for producing highlight color and the location and width of a virtual printhead to define the location of picture elements (pels) in said highlight color relative to the medium.

25. The apparatus of claim 24 wherein said spot color printer is an ink jet printer with a plurality of physical printheads which are positioned by said spot color printer in accordance with said first verification number(s) to provide highlight color on the medium in accordance with the virtual printhead data corresponding to said first verification number(s).

26. Apparatus for assuring verification of the proper configuration of a peripheral device to a data processing system so that said system terminates a job before it starts if assurance is not achieved, said apparatus placing the complexities of peripheral configuration at the peripheral device, thus assuring valid system software and data stream regardless of the type of peripheral device and regardless of future changes in peripheral device capabilities, comprising:
- a data processing system;
- a peripheral device connected to said data processing system;
- means for entering into the memory of said peripheral device a first configuration needed to properly perform a first job and a first verification number(s) corresponding to said first configuration;
- a resource object available to said system;
- means for placing said first verification number(s) into said resource object available to said system;
- means for retrieving said first verification number(s) from said resource object;
- means for setting up said peripheral device in accordance with said first verification number(s);
- means for ascertaining whether said peripheral device is properly configured; and
- means for terminating said job if said peripheral device is not set up properly;
- wherein said resource object includes print control objects comprised of structured fields having print control parameters including medium level controls, and wherein said means for placing said first verification number(s) into a resource object includes:
  - means for placing said first verification number(s) into the structured data field corresponding to the presentation sub-system (peripheral) setup identification.

27. The apparatus of claim 26 wherein said peripheral is a spot color printer and wherein said presentation sub-system identification includes a keyword corresponding to a configuration of said spot color printer.

28. The apparatus of claim 27 wherein said first verification number(s) identify said spot color printer setup for producing highlight color and the location and width of a virtual printhead to define the location of picture elements (pels) in said highlight color relative to the medium.

29. The apparatus of claim 28 wherein said spot color printer is an ink jet printer with a plurality of physical printheads which are positioned by said spot color printer in accordance with said first verification number(s) to provide highlight color on the medium in accordance with the virtual printhead data corresponding to said first verification number(s).

30. A method of assuring verification of the proper configuration of a peripheral device to a data processing system so that said system terminates a job before it starts if assurance is not achieved, said method placing the complexities of peripheral configuration at the peripheral device, thus assuring valid system software and data stream regardless of the type of peripheral device and regardless of future changes in peripheral device capabilities, comprising the machine implemented steps of:
- providing for the placement of said first verification number(s) into a resource object available to said system;
- at job request time, providing for the retrieval of said first verification number(s) from said resource object;
- providing for the ascertainment of whether said peripheral device is properly configured; and
- providing for the termination of said job if said peripheral device is not set up properly;
- wherein the step of providing for the ascertainment of whether said peripheral device is properly configured further includes the steps of:
  - providing for the reception by said system of a list of verification numbers corresponding to the current setup of said peripheral device; and
  - providing for the comparison of said first verification number(s) retrieved from said resource object to the received list of verification number(s) and if said first verification number(s) retrieved from said resource object are found to be a subset of the number(s) in said received list, allowing said first job to commence its run, but if a match is not found, terminating said first job.

31. The method of claim 30 wherein said method further includes the step of
- providing for the setting up of said peripheral device in accordance with said first verification number(s) by providing for the transmittal of said first verification number(s) retrieved from said resource object to said peripheral device.

32. The method of claim 30 wherein said peripheral device is a printer and wherein said resource object includes print control objects comprised of structured fields containing print control parameters including medium level controls, and wherein said step of providing for the placement of said first: verification number(s) into a resource object further includes the step of
- providing for the placement of said first verification number(s) into a structured data field corresponding to the presentation setup identification.

33. An article of manufacture comprising a computer readable medium having embodied therein a method of assuring verification of the proper configuration of a peripheral device to a data processing system so that said system terminates a job before it starts if assurance is not achieved, said method placing the complexities of peripheral configuration at the peripheral device, thus assuring valid system software and Data stream regardless of the type of peripheral device and regardless of future changes in peripheral device capabilities, comprising the machine implemented steps of:
- providing for the placement of said first verification number(s) into a resource object available to said system;
- at job request time, providing for the retrieval of said first verification number(s) from said resource object;
- providing for the ascertainment of whether said peripheral device is properly configured; and
- providing for the termination of said job if said peripheral device is not set up properly;
- wherein the step of providing for the ascertainment of whether said peripheral device is properly configured further includes the steps of:
  - providing for the reception by said system of a list of verification numbers corresponding to the current setup of said peripheral device; and providing for the comparison of said first verification number(s) retrieved from said resource object to the received list of verification number(s) and if said first verification number(s) retrieved from said resource object are found to be a subset of the number(s) in said received list, allowing said first job to commence its run, but if a match is not found, terminating said first job.

34. The article of manufacture of claim 33 wherein said method further includes the step of providing for the setting up of said peripheral device in accordance with said first verification number(s) by providing for the transmittal of said first verification number(s) retrieved from said resource object to said peripheral device.

35. The article of manufacture of claim 33 wherein said peripheral device is a printer and wherein said resource object includes print control objects comprised of structured fields containing print control parameters including medium level controls, and wherein said step of providing for the placement of said first verification number(s) into a resource object further includes the step of providing for the placement of said first verification number(s) into a structured data field corresponding to the presentation setup identification.

* * * * *